May 11, 1954     H. L. POTTER     2,678,246
SELF-ALIGNING BEARING
Filed Jan. 10, 1952
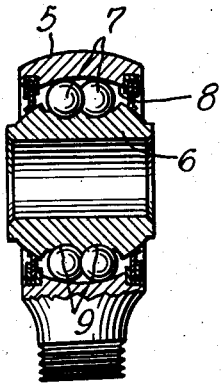
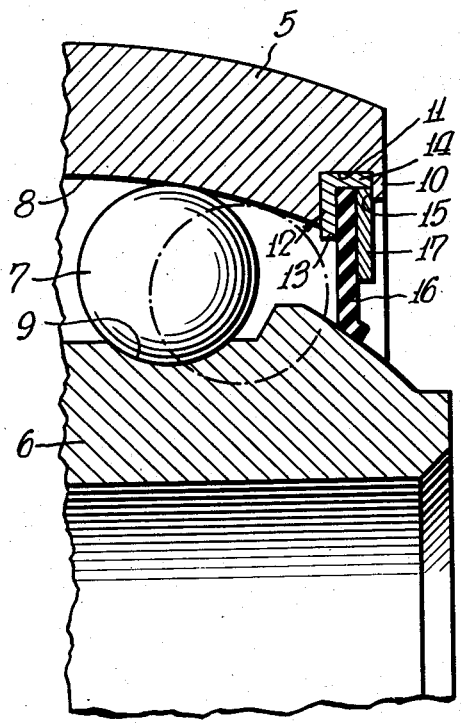
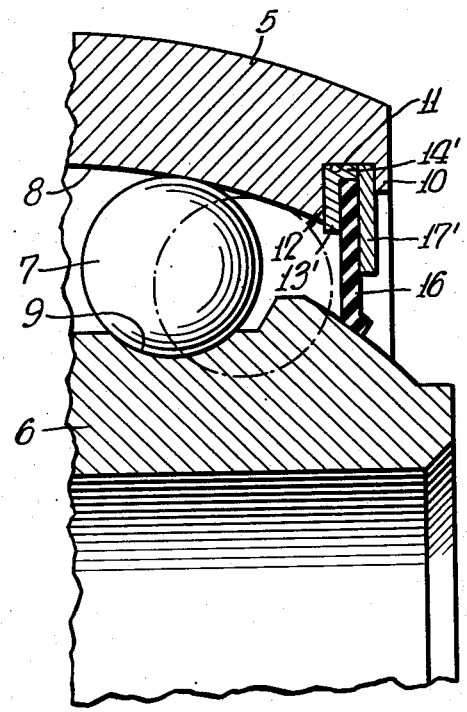
INVENTOR
Howell L. Potter
BY
Mitchell & Bechert
ATTORNEYS Patented May 11, 1954

2,678,246

UNITED STATES PATENT OFFICE 2,678,246

SELF-ALIGNING BEARING

Howell L. Potter, New Britain, Conn., assignor to The Fafnir Bearing Company, New Britain, Conn., a corporation of Connecticut Application January 10, 1952, Serial No. 265,827

9 Claims. (Cl. 308—187.2)

My invention relates to a self-aligning bearing and more particularly to improved means for limiting self-alignment thereof. This invention is in the nature of an improvement over that disclosed in my copending patent application, Serial No. 632,244, filed December 1, 1945, now Patent No. 2,584,227, February 5, 1952.

Self-aligning bearings include inner and outer bearing rings with interposed antifriction bearing members. One of the rings is provided with a spherical raceway surface for the antifriction bearing members, so that the rings may be misaligned without disturbing the functions of the bearing. When seals are employed in self-aligning bearings, such seals are usually carried by the ring having the spherical surface, and during extreme misalignment, for example, when handling the bearing prior to installation, antifriction bearing members often so forcibly engage the seals as to snap them out, with consequent annoyance or damage. Whether or not seals are employed, extreme misalignment will permit the antifriction bearing members to fall out, with consequent collapse of the bearing.

It is an object of my invention to provide improved means for limiting misalignment of the rings in a self-aligning bearing.

It is another object to provide means for limiting misalignment of the rings of a self-aligning bearing to such an extent that the antifriction bearing members cannot so forcibly engage a seal as to force it out.

Other objects and various features of novelty and invention will be hereinafter pointed out or will become apparent to those skilled in the art.

In the drawings, which show, for illustrative purposes only, preferred forms of the invention:

Fig. 1 is a central sectional view through a self-aligning bearing embodied in a rod-end fitting, but the invention is not dependent upon any particular application of the bearing as such;

Fig. 2 is an enlarged fragmentary sectional view of the bearing shown in Fig. 1; and Fig. 3 is a view similar to Fig. 2 but illustrating a modification.

The self-aligning bearing includes an outer bearing ring 5, and an inner bearing ring 6 with interposed antifriction bearing members 7. One of the rings (in this case the outer ring 5) is provided with a spherical raceway surface 8, while the other ring (in this case the inner) is provided with two standard raceway grooves 9. The two raceway grooves 9 are illustrated because this particular bearing is a double-row bearing; in a single-row bearing, of course, a single groove 9 would be provided. Self-aligning bearings of the type just described are old and well known in the art.

In order to limit misalignment of the rings 5—6, I employ abutment means carried by the ring having the spherical surface; in the form illustrated, the outer ring has the spherical surface and is, therefore, provided with shoulder means 10. At one end of the bearing, the shoulder means 10 may define one wall of a radial groove 11, and an abutment, preferably in the form of a split snap ring 12, may be seated in the groove 11. The abutment ring 12 preferably includes a radially extending part 13 projecting into the path of movement of the antifriction members 7, and the extent of such projection is preferably less than one half the radius of the antifriction members 7, so that in the case of the antifriction members 7, which happen to be balls, there may be a radially directed thrust of the balls 7 on the projecting part 13 when limiting misalignment of the bearing.

In accordance with the invention, means are provided whereby the shoulder means 10 may directly sustain axial thrust-abutment forces occasioned when the antifriction elements 7 strike projecting means 13, and whereby at the same time a resilient seal member may be supported by these thrust-sustaining parts. This result may be achieved by a combination of relatively rigid parts to axially rigidly span the width of the groove 11, and in the forms shown these parts assemble into a generally U-shaped cross-section, defined by two radially extending parts spaced by an axially extending part. If the abutment member 12 were a flat snap ring seated in groove 11 at the axially inner side thereof, then such flat ring could constitute one of the radially extending parts and a cylindrical ribbon, bottomed in the remainder of the groove 11, could be the axially extending part, in order to achieve the desired thrust-sustaining relation against shoulder means 10; however, in the form shown in Fig. 2, I provide the abutment ring 12 with an integral axially extending flange 14, which may have substantially the full axial extent of the groove 11. Thus, in the form shown, the ring 12 integrally includes the axially extending part and one of the radially extending parts of a U-shaped section. The thickness of the material of member 12 is preferably less than the radial depth of the groove 11 at shoulder means 10. This relationship will be appreciated as providing a sufficient shoulder at 15 to retain sealing means inserted after insertion of the ring 12. In the form shown, such sealing means includes an annular ring 16 of resilient material and an outer retaining snap ring 17; the snap ring 17 thus constitutes the second radially extending part of the U-shaped cross-section. If desired, the resilient ring 16 may be bonded to either of the radially extending parts 13—17, or it may be preferred that the resilient ring be totally separate from the split rings 12—17.

In the alternative construction shown in Fig. 3, the abutment ring 12' resembles that described at 12 in Fig. 2, except that the axial flange 14' thereof extends short of the shoulder means 10. This construction provides an axial clearance for accommodation of the snap ring 17' in the bottom of the groove 11, and the resilient seal means 16 may again be supported between the two radially extending parts 13'—17'. In the construction of Fig. 3, it will be appreciated that the shoulder means 10 provides the same degree of rigid axial thrust-limiting abutment for the member 12' as in the case of member 12 in Fig. 2; also, it will be noted that the relatively rigid parts 12'—17' establish a seal support of generally U-shaped cross-section.

It will be appreciated that I have described an improved abutment and seal for self-aligning antifriction bearings. In the forms illustrated, misalignment is stopped before the antifriction bearing members even engage the resilient seal member. In practice, the parts may be so proportioned that the antifriction bearing members may engage the seal, but the antifriction bearing members should not be permitted to move far enough to engage the seal sufficiently to force it out of the bearing ring. When my improved means for limiting misalignment of the bearing rings is employed, seals may be removed for inspection or greasing of the bearing without danger of having a bearing accidentally fail due to loss of antifriction bearing members. Furthermore, self-aligning bearings with my improved limiting means may be freely handled in the shop and before seals are installed, all without danger of extreme misalignment. From the manufacturing viewpoint, my invention provides the above-indicated advantages with a single relatively wide groove that is less likely to involve tool breakage than are multiple narrow-groove constructions heretofore employed.

While the invention has been described in considerable detail and preferred forms illustrated, it is to be understood that various changes may be made within the scope of the invention as defined in the appended claims.

I claim:

1. In a self-aligning bearing including inner and outer bearing rings with interposed antifriction bearing members, one of said rings having a spherical raceway surface for said antifriction bearing members, whereby said rings may be misaligned, one of said bearing rings having an annular seal groove therein, a flanged ring in said groove, said flanged ring including an axially inner radially extending portion extending radially into the path of the said antifriction bearing members, said flanged ring further including an axially extending portion bottomed in said groove, and seal means of resilient sealing material carried by said flanged ring.

2. A bearing according to claim 1, in which said groove has an axial extent limited by an axially outer wall and in which the axially extending part of said flanged ring is of substantially the axial extent of said groove, whereby the abutment thrust from said antifriction bearing members on said flanged ring may be sustained directly by the axially outer wall of said groove.

3. A bearing according to claim 1, in which said groove has an axial extent limited by an axially outer wall and in which the axial extent of said axially extending portion of said flanged ring is short of the axial extent of said groove, and a snap ring seated in said groove between said flanged ring and the axially outer wall of said groove.

4. In a self-aligning bearing including inner and outer bearing rings with interposed antifriction bearing members, one of said rings having a spherical raceway surface for said antifriction bearing members, whereby said rings may be misaligned, said one of said bearing rings having an annular seal groove therein, and a combination abutment and seal seated in said groove, said combination including a two-piece seal-supporting member of generally U-shaped cross-section, one of said pieces including a flanged ring with a radially extending part and an axially extending part, and the other said pieces including a radially extending part and abutting said axially extending part, the axially inner of said radially extending parts extending into the path of said antifriction bearing members, and a ring of resilient sealing material supported between said radially extending parts.

5. A bearing according to claim 4, in which the axially outer of said radially extending parts is of greater radial extent than the axially inner of said radially extending parts.

6. In a self-aligning bearing including inner and outer bearing rings with interposed antifriction bearing members, one of said rings having a spherical raceway surface for said antifriction bearing members, whereby said bearing may be self-aligning, said one of said rings with the spherical raceway surface having circumferential radial shoulder means at one side, an abutment ring on the axially inward side of said shoulder means and axially retained thereby, said abutment ring projecting radially beyond said spherical raceway surface and including a part in axial thrust-sustaining abutment with said shoulder means, and a seal member of flexible material supported by said abutment ring axially between said shoulder means and the radially projecting part of said ring.

7. In a self-aligning bearing including inner and outer bearing rings with interposed antifriction bearing members, one of said rings having a spherical raceway surface for said antifriction bearing members, whereby said rings may be misaligned, one of said bearing rings having an annular seal groove therein, said groove being limited by an axially outer generally radially extending abutment wall, a flanged ring in said groove, said flanged ring including an axially inner abutment portion including circumferentially extending means extending out of said raceway surface and therefore in limiting relation with said bearing members, an axially outer abutment portion in direct limiting abutment with said wall, and seal means of resilient seal material carried by said flanged ring.

8. In a self-aligning bearing including inner and outer bearing rings with interposed antifriction bearing members, one of said rings having a spherical raceway surface for said antifriction bearing members, whereby said rings may be misaligned, one of said bearing rings having an annular seal groove therein, said groove being limited by an axially outer generally radially extending abutment wall, a flanged ring in said groove, said flanged ring including an axially inner abutment portion including circumferentially extending means extending out of said raceway surface and therefore in limiting relation with said bearing members, said flanged ring further including a radially extending portion in abutment with said wall, and seal means of resilient seal material carried by said flanged ring.

9. In a self-aligning bearing including inner and outer bearing rings with interposed antifriction bearing members, one of said rings having a spherical raceway surface for said antifriction bearing members, whereby said rings may be misaligned, one of said bearing rings having an annular seal groove therein, said groove being limited by an axially outer generally radially extending abutment wall, an abutment ring in said groove, said abutment ring including an axially inner abutment portion including circumferentially extending means extending out of said raceway surface and therefore in limiting relation with said bearing members, an axially outer abutment portion in direct limiting abutment with said wall, and seal means of resilient seal material carried by said abutment ring.

References Cited in the file of this patent

UNITED STATES PATENTS

| Number | Name | Date |
| --- | --- | --- |
| 2,067,464 | Smith | Jan. 12, 1937 |
| 2,298,463 | Burt | Oct. 13, 1942 |

FOREIGN PATENTS

| Number | Country | Date |
| --- | --- | --- |
| 780,937 | France | May 6, 1935 |